United States Patent [19]
Jenkner et al.

[11] Patent Number: 4,594,024
[45] Date of Patent: Jun. 10, 1986

[54] OFFSHORE INTAKE STRUCTURE

[76] Inventors: Wolfgang R. Jenkner, 2139 Varency Drive, Mississauga, Ontario, Canada, L5K 1C2; Alan E. Christie, 37 Quincy Cresent, Willowdale, Ontario, Canada, M2J 1C5; Emad E. M. Elsayed, 4 Fassett Avenue, Hamilton, Ontario, Canada, L9C 4E7; John S. Griffiths, 28 South Kingslea Drive, Etobicoke, Ontario, Canada, M8Y 2A4; Guney A. Mentes, 135 Silas Hill Drive, Willowdale, Ontario, Canada, M2J 2X8

[21] Appl. No.: 598,707

[22] Filed: Apr. 10, 1984

[51] Int. Cl.$^4$ ............................ E02B 5/08; E02B 9/04
[52] U.S. Cl. ........................ 405/127; 405/52; 405/80; 210/154
[58] Field of Search ............... 405/46, 52, 80, 81, 405/77, 127; 210/156, 157, 160, 162, 170, 154; 137/363

[56] References Cited
U.S. PATENT DOCUMENTS

| | | | |
|---|---|---|---|
| 300,576 | 6/1984 | Cole | 405/127 |
| 894,339 | 7/1908 | Niemeier | 405/127 |
| 2,361,231 | 10/1944 | Nebolsine | 405/127 X |
| 3,910,051 | 10/1975 | Komisarek | 210/170 X |
| 3,927,534 | 12/1975 | Larson et al. | 405/127 |
| 4,313,692 | 2/1982 | Johnson | 405/46 X |
| 4,335,977 | 6/1982 | Ihli | 405/52 |

Primary Examiner—Cornelius J. Husar
Assistant Examiner—Nancy J. Stodola
Attorney, Agent, or Firm—Ridout & Maybee

[57] ABSTRACT

An offshore intake structure for a water cooling system having an intake shaft communicating with a lake or like reservoir comprises a well excavated in the bed of the lake having an opening communicating with the intake shaft. The well is covered by a submarine roof structure having a perforate outer region defining an inlet to the well and an imperforate inner region which extends over the intake shaft opening and radially outwards therefrom so as to define with the well bottom a horizontal flow passage extending inwards to the intake shaft. The construction is such as to permit an adequate intake flow while keeping the intake velocity below the limit at which fish would be entrained.

9 Claims, 8 Drawing Figures

OFFSHORE INTAKE STRUCTURE

This invention relates to offshore water intake structures, and is concerned particularly with an intake structure for a once-through water cooling system of the type which is supplied from a reservoir and has an intake shaft communicating with the reservoir. The term "reservoir" is used herein to denote any body of water of substantial area, such as a lake or a river, adequate to supply the cooling system and adequate to meet the cooling requirements of a thermal or nuclear generating station or other large industrial plant.

The intake of such a cooling system must obviously be capable of providing sufficient water flow to meet the cooling requirements. However, this requirement has given rise to two major problems. First, the water flow velocity and velocity distribution patterns around the intake structure may disturb the ecological system of the bed of the reservoir, particularly at the intake location, to an unacceptable degree. Second, it has been pointed out that existing intake structures have been unable to prevent the entrainment of large schools of fish. The latter problem is particularly serious, because apart from damage to the ecology the entrainment of fish may result in clogging which requires shut-down or partial shut-down of the system so that cleaning and repair can be effected.

Various attempts have been made to overcome these problems by installing modified intake structures. The modified intake structures are of four general types: the surface cofferdam type, the multiple fine screen type, the velocity cap type, and the submerged porous intake type. While these modified intake structures have their respective advantages they also have their respective disadvantages, instability and susceptibility to clogging, besides installation cost, being the major concerns.

The present invention provides an intake structure which offers an attractive alternative to the existing structures. The intake structure has a most effective means of preventing fish entrainment, is not susceptible to clogging, and compares most favourably with the other intake structures in terms of constructability, hydraulic performance, safety and structural and operational reliability.

An offshore intake structure in accordance with the invention comprises means defining a well excavated in the bed of the reservoir, the well having a substantially flat bottom with an outlet opening communicating with said intake shaft and being bounded by a peripheral wall, means defining a horizional submarine roof structure extending over the entire area of the well, the roof structure being bounded by said peripheral wall, and means supporting the roof structure on the bottom of the well in spaced relation thereto, thereby defining a well chamber, the roof structure having a perforate peripheral region defining an inlet to the well chamber and an imperforate central region encircled by said peripheral region, the central region of the roof structure extending over the outlet opening and radially outwards therefrom so as to define with the well bottom a horizontal radially converging flow passage extending from said well chamber inlet to the intake pipe.

Preferably the roof structure and supporting means therefor are of modular precast concrete construction.

In order that the invention may be readily understood, one intake structure in accordance with the invention will now be described, by way of example, with reference to the accompanying drawings, in which.

Figure 1:
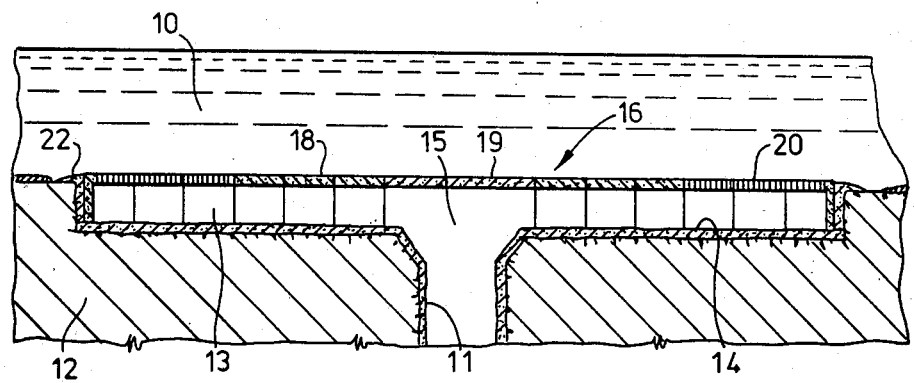
FIG. 1 is a cross-sectional view of the intake structure, taken on line 1—1 in FIG. 2.
Figure 2:
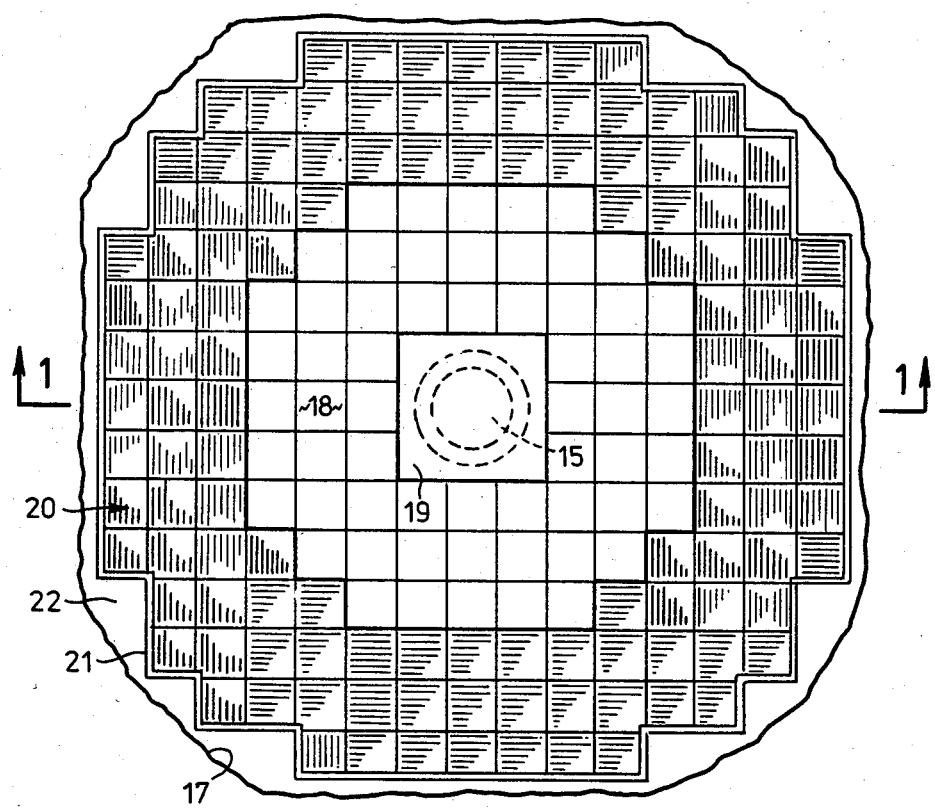
FIG. 2 is a plan view of the intake structure.
Figure 3:
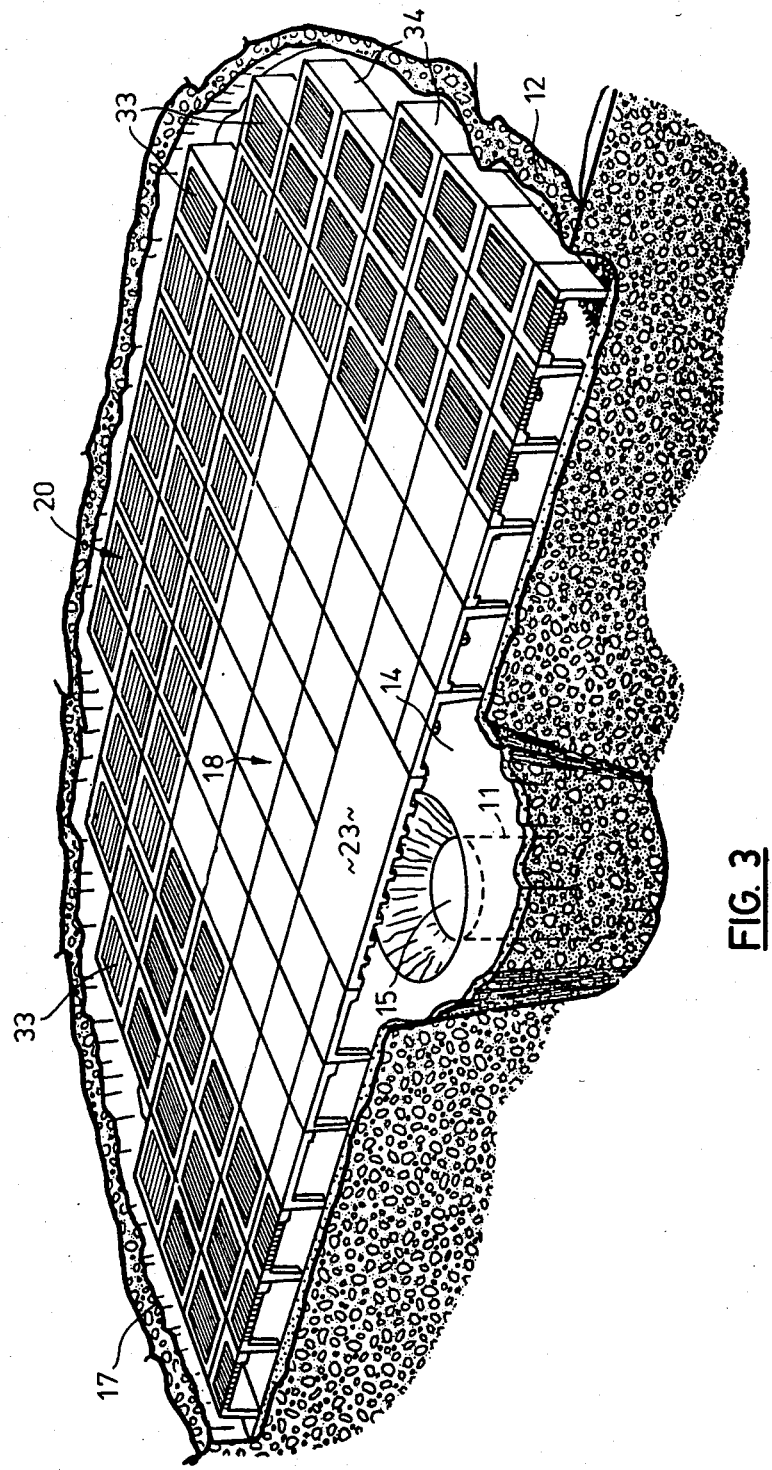
FIG. 3 is a broken away perspective view of the intake structure.

Referring to FIGS. 1, 2 and 3, the intake structure is designed for use with a once-through water cooling system supplied from a reservoir 10, such as a lake, and having an intake shaft 11 communicating with the reservoir. The intake shaft 11 extends downwardly from the bed of the reservoir 10 and is connected to a pumping and screening station (not shown) of the cooling system. The bed 12 of the reservoir 10 is excavated to provide a cavity or well 13. The depth of the well is small in relation to its horizontal dimensions; thus in the present example the well is approximately 85 meters wide and 3 meters deep. The well has a substantially flat bottom which is lined with a tremie concrete pad 14 extending from the intake shaft opening 15 to the perimeter 17 of the well. A horizontal submarine roof structure 16 extends over the entire area of the well and is supported on the concrete pad 14 in spaced relation to the bottom of the well so as to define a well chamber.

The roof structure 16 and its support means are of modular precast concrete construction. The modules thereof are assembled in such a way as to provide, as denoted by reference numerals in FIG. 2, an inner imperforate central region 18 having a centerpiece 19, which central region covers the intake shaft opening 15 and extends radially outwards therefrom, and an outer perforate region 20 which encircles the central region 18 and extends therefrom to a peripheral wall 21 which lines the perimeter 17 of the well. The peripheral wall 21 is formed in part by the peripheral modules of the outer region 20 and in part by backfill 22 packing the space between the sides of the well and the peripheral modules.

Figure 4:
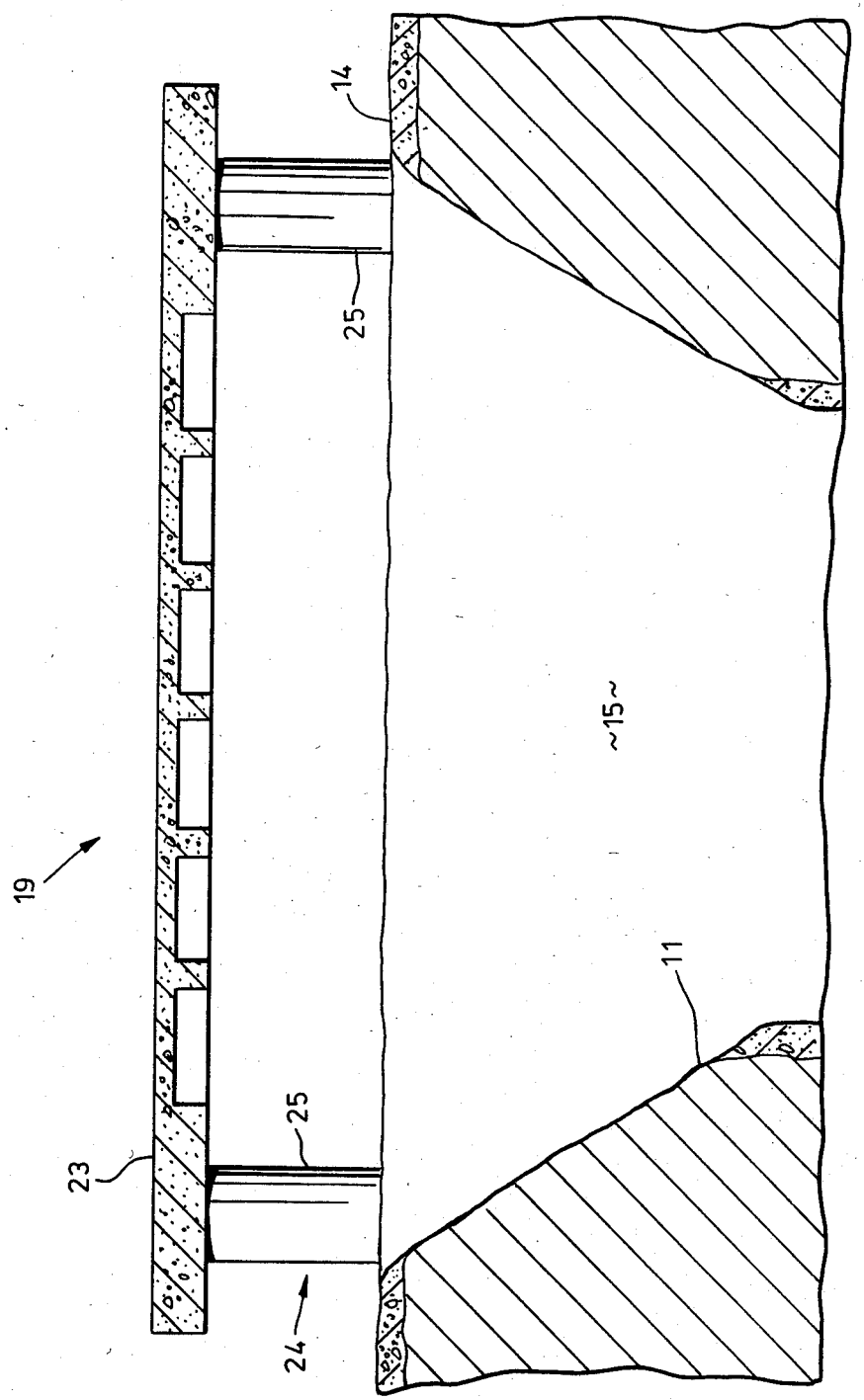
FIG. 4 is a cross-sectional view, on an enlarged scale, of a detail of the intake structure, the figure showing the intake shaft opening and an associated centrepiece.
Figure 5:
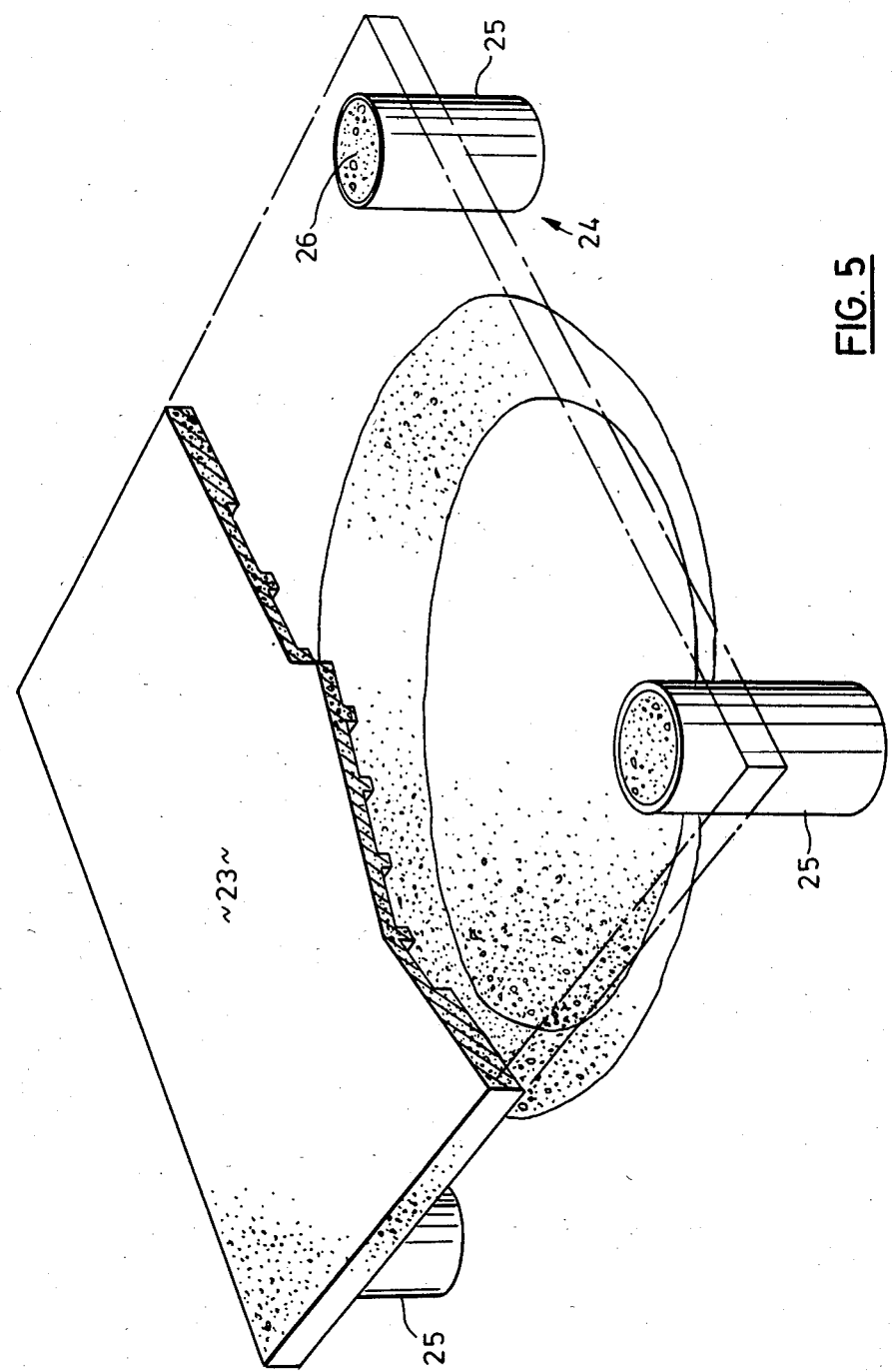
FIG. 5 is a perspective view of the same detail as FIG. 4, partly broken away to reveal a support structure and the intake shaft opening.
Figure 6:
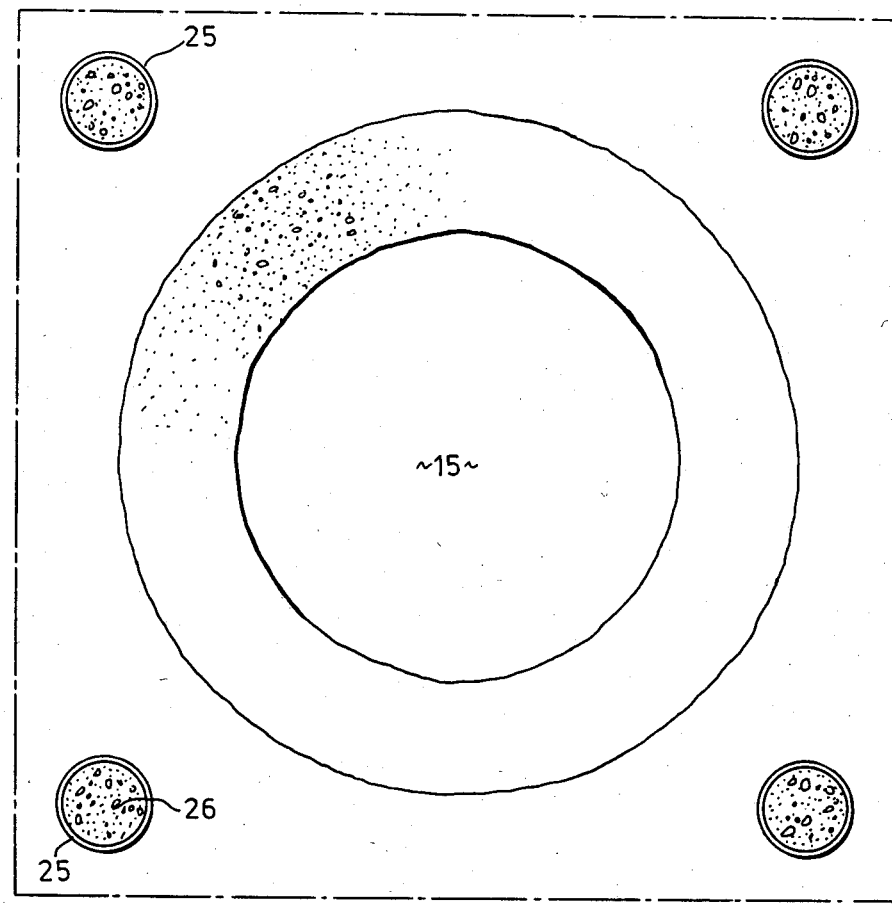
FIG. 6 is a plan view of the support structure of the centrepiece.

As best shown in FIGS. 4, 5 and 6, the centrepiece 19 is constituted by a precast concrete slab 23, rectangular in shape and preferably square, mounted horizontally on a steel support structure 24. The slab 23 has a flat upper surface and a waffled underside. The steel support structure 24 comprises four tubular posts 25 arranged at the corners of a square around the intake opening 15, the posts being filled with concrete 26. The support structure 24 is mounted on the concrete pad 14 and supports the slab 23 at a predetermined height therefrom.

Figure 7:
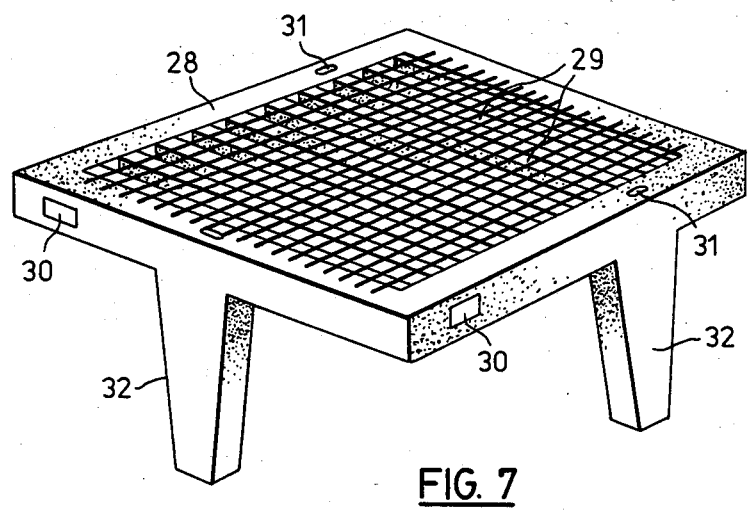
FIG. 7 illustrates one of the precast concrete modules employed in the intake structure.

The modules of the central and outer regions 18, 20 of the roof structure are also of precast concrete, all having the same shape and dimensions. One module of the perforate outer region 20 is shown in FIG. 7. This consists of a unitary casting, rectangular in shape and preferably square. The module has a horizontal slab portion 28 which is made perforate by reason of slots 29 extending in the direction of its length. The edges of the slab portion 28 are provided with rubber bumpers 30 to facilitate installation, and with lifting lugs 31 to facilitate handling. Integrally formed with the slab portion 28 are downwardly extending feet 32 which, in the final assembly, engage the concrete pad 14 and support the slab portion at a predetermined height in horizontal alignment with the slab 23 of the centrepiece 19.

The modules of the outer region 20, except for the peripheral modules 33 (FIG. 3) are of similar construction. However, the peripheral modules 33 are modified in that they have unbroken wall portions 34 on one or two sides which, in the final assembly, form a continuous wall. As previously mentioned, backfill is packed between this continuous wall and the sides of the well to form a continuous peripheral wall 21.

The modules of the central region 18 are also of precast concrete. They are identical in shape and dimensions with the modules of the outer region 20, as shown in FIG. 7, with the exception that the horizontal slab portions 28 thereof are imperforate, there being no slots corresponding to 29.

The modules of the central and peripheral regions and the centrepiece slab 23, are assembled edge to edge forming a rectangular closely packed array as shown in FIGS. 2 and 3, the resultant roof structure extending across the entire area of the well and being bounded by the peripheral wall. The roof structure defines with the lined well bottom a well chamber having a peripheral inlet formed by the perforate peripheral region of the roof structure. The modules of the perforate peripheral region are arranged as far as possible with their slots transverse to the radial intake lines. The imperforate central region 18 extends across the intake shaft opening 15 and extends across the intake shaft opening 15 and extends radially outwards therefrom so as to define with the well bottom a horizontal radially converging water flow passage through which water can flow from the peripheral inlet to the intake shaft.

For any given installation the areal dimensions of the roof structure and the depth of the well will depend upon the particular plant cooling requirements and can be selected on the basis of routine design considerations. Thus, the basic requirement is an adequate volumetric rate of water flow into the intake shaft 11. The area of the openings of the perforate peripheral region 20 of the roof structure must therefore be sufficient to permit this volumetric rate of flow. However, the flow velocity at the openings of the peripheral region must be low enough to enable fish in their immediate vicinity to escape.

Figure 8:
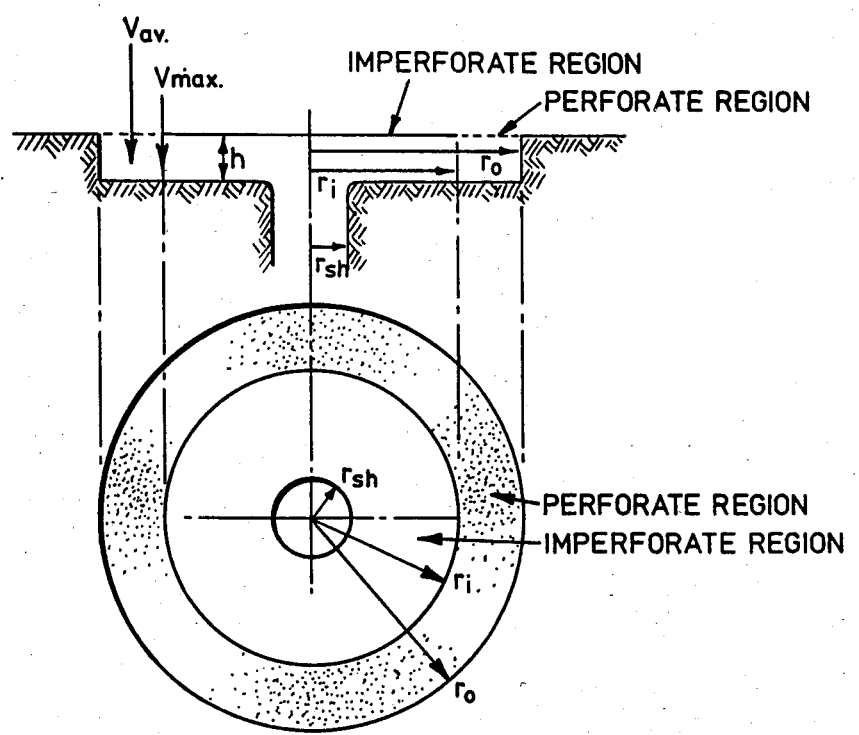
FIG. 8 is a schematic diagram of the intake structure shown in FIGS. 1 and 2, but simplified to show the relevant design criteria.

The design parameters of the intake structure will now be discussed with reference to FIG. 8, in which the intake structure is shown as having radial symmetry, the external and internal radii $r_o$, $r_i$ of the perforate outer region of the roof structure corresponding to the mean radial distance of the outer and inner edges of said outer region from the axis of the intake shaft.

The following parameters are given, being determined by the nature and size of the cooling system itself:
Q=Maximum volumetric rate of inflow.
$r_{sh}$=Radius of intake shaft.

The following parameters will depend upon the nature of the fish population and will vary from case to case:

$V_{av}$=Average intake velocity over the perforate region of the roof structure.
$V_{max}$=Maximum intake velocity at the perforate region of the roof structure.

The parameters $V_{av}$ and $V_{max}$ are therefore also given in any particular case.

The porosity P of the perforate outer region of the roof structure, represented by the ratio of the total area of its openings $A_o$ to its total area $A_p$ should be as high as possible. However, it is limited by structural design considerations and for most practical purposes should be limited to 0.35. This parameter, when selected, can be treated as a constant for all intake structures of the type under discussion.

From the relationships $$A_o = \frac{Q}{V_{av}}$$

$$A_p = \frac{A_o}{P}$$

the parameter $A_p$ can be readily determined. It remains to optimize the design parameters, h, $r_o$, $r_i$. The well depth h should be as small as possible, in the interest of economy, and may be as small as 1 m. A practical limit is set by construction feasibility and ease of maintenance, however, and it is preferred that the value h should be about 2 m.

For the given values of Q, $V_{av}$, $V_{max}$, $A_p$ and several assumed values of h within an acceptable range, pairs of values for $r_i$ and $r_o$ are determined either by theoretical analysis of energy gradients and hydraulic losses or by physical test models. Each solution satisfies the stipulated values of $V_{av}$ and $V_{max}$ and is associated with a different well volume $\pi r_o^2 h$. The design parameters h, $r_i$ and $r_o$ are then selected on the basis of the following considerations:
uniformity of intake velocity distribution over the perforate region of the roof structure;
economy, i.e. volume of excavation required;
construction feasibility.

It should be noted that the intake velocity variation $V_{max}/V_{av}$ increases with the ratio $r_o/r_i$, and in a limiting case reaches its maximum when $r_i=r_{sh}$.

The illustrated embodiment of the invention, given by way of example only, relates to a specific design having the following specification:

| | |
|---|---|
| Well Diameter | 85 m |
| Well Depth | 3 m |
| Well Chamber Internal Diameter | 82.5 m |
| Well Chamber Internal Depth | 2.4 m |
| Mean Radius of Roof Structure | 41.25 m |
| Porosity of Perforate Region | 32% |
| Mean Radius of Imperforate Region | 24.75 m |
| Radius of Intake Shaft | 4.75 m |
| Volumetric Flow Rate | 120 m³/sec.–150 m³/sec. |
| Average Intake Velocity | 0.15 m/sec. |
| Maximum Inlet Velocity | 0.30 m/sec. |
| Depth of Water above Roof Structure | 10 m |
| Slot Width | 140 mm |
| Spacing between Slots | 170 mm |

The slots 29 of the modules of the perforate region may be crossed by thin dividers 35 laid transversely across the modules to form a grid pattern of openings. The entry to the slots may be flared to prevent ice buildup.

The well and the roof structure as illustrated are not circular, although they could be circular and in any case can be regarded as approximately circular for the purpose of calculating their radial dimensions.

What we claim is:

1. An offshore intake structure for a once-through water cooling system supplied from a reservoir and having an intake shaft communicating with the reservoir, comprising:
   means defining a well excavated in the bed of the reservoir, the well having a substantially flat bottom with an outlet opening communicating with said intake shaft and being bounded by a peripheral wall,
   means defining a horizontal submarine roof structure extending over the entire area of the well, the roof structure being bounded by said peripheral wall, and
   means supporting the roof structure from the bottom of the well in spaced relationship thereto, thereby defining a well chamber,
   the roof structure having a horizontally extending perforate peripheral region defining an inlet to the well chamber through which water flows downwardly from the reservoir into the well chamber, and a horizontally extending imperforate central region encircled by said peripheral region, the central region of the roof structure extending over the outlet opening and radially outwards therefrom so as to define with the well bottom a horizontal radially converging flow passage extending from said well chamber inlet to the intake pipe.

2. An offshore intake structure according to claim 1, wherein the bottom of the well is lined with a concrete pad extending from the peripheral wall to the intake shaft.

3. An offshore intake structure according to claim 2, wherein the roof structure and supporting means therefor are of modular precast concrete construction.

4. An offshore intake structure according to claim 2, wherein the roof structure and supporting means therefor comprise:
   a precast concrete slab positioned to extend over the intake shaft opening,
   a steel support structure mounted on the concrete pad and supporting the slab horizontally at a predetermined height therefrom,
   a first plurality of identical, precast concrete modular elements assembled around the concrete slab and forming therewith the inner region of the roof structure, each such element comprising an imperforate horizontal slab portion with integral downwardly extending feet engaging the concrete pad to support the slab portion at said predetermined height, and
   a second plurality of identical, precast concrete modular elements assembled around said first plurality of elements and extending therefrom to the peripheral wall to form the outer region of the roof structure, each such element comprising a perforate horizontal slab portion with integral downwardly extending feet engaging the concrete pad to support the slab portion at said predetermined height.

5. An offshore intake structure according to claim 4, wherein the roof structure further comprises a third plurality of identical, precast concrete modules each having a horizontal slab portion with an integral side wall portion depending downwardly therefrom, said modules being assembled around the second plurality of elements in edge to edge relationship therewith, the modules constituting the peripheral elements of the roof structure and said side wall portions meeting edge to edge to form said peripheral wall which defines the periphery of the well chamber.

6. An offshore intake structure according to claim 5, wherein said concrete slab and the slab portions of the modular elements are rectangular and are assembled edge to edge in a rectangular array to define the roof structure.

7. An offshore intake structure according to claim 6, wherein the slab portion of each of said second plurality of modular elements is formed with rectilinear slots, constituting the perforations of the slab portion, extending in the direction of the length of the slab portion and in a direction transverse to the horizontal component of water flow in their vicinity.

8. An offshore intake structure according to claim 7, wherein each of said second plurality of modular elements further comprises an array of dividing elements laid transversely across said rectilinear slots and defining therewith a grid pattern of openings.

9. An offshore intake structure according to claim 7, wherein the porosity of said perforate region of the roof structure is not more than 0.35.

* * * * *